Jan. 9, 1962     E. P. MacDONOUGH     3,016,047
DEVICE FOR HYDRAULIC POWERING SYSTEM
Filed Dec. 23, 1959
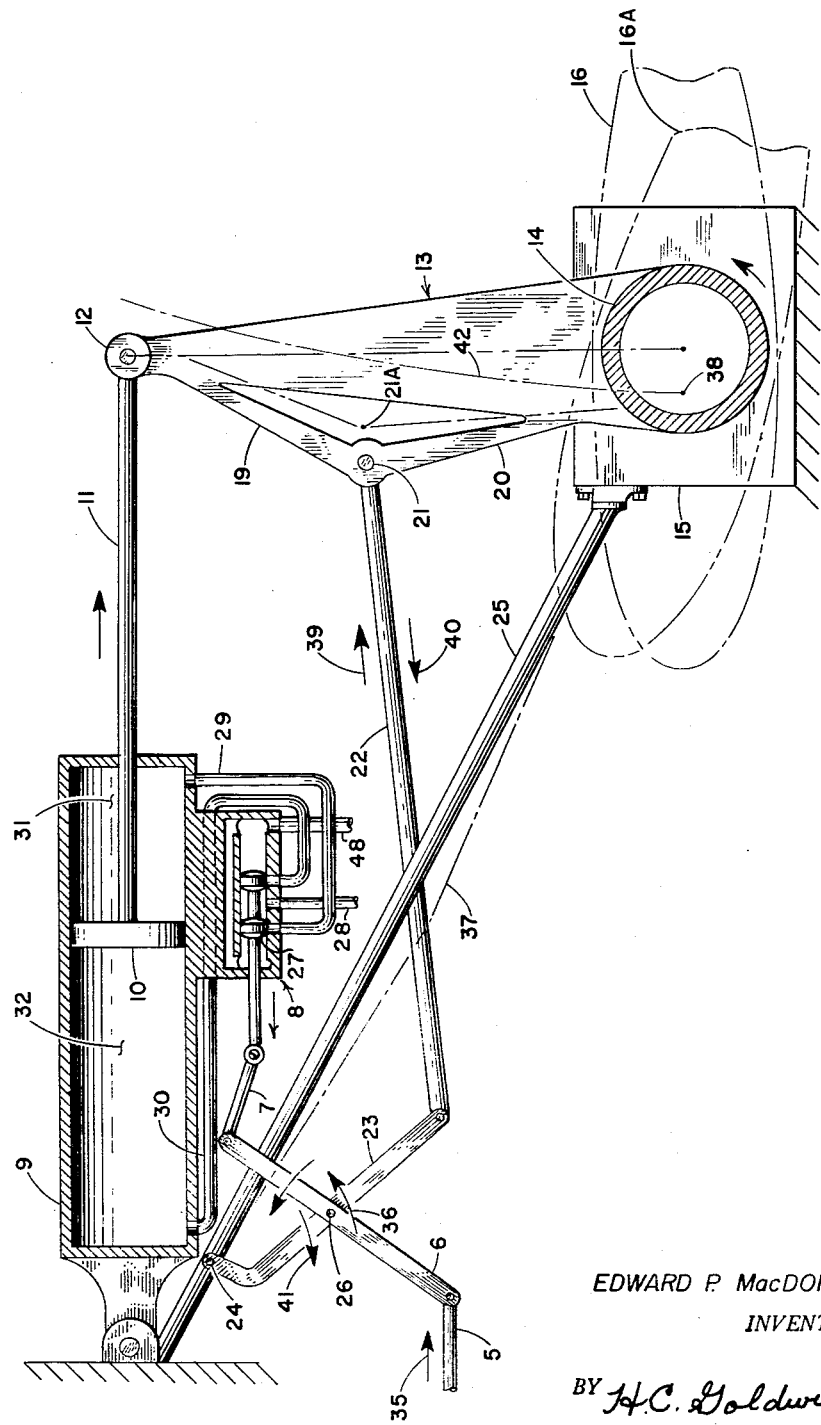
EDWARD P. MacDONOUGH
INVENTOR.
BY *H.C. Goldwire*
AGENT United States Patent Office 3,016,047
Patented Jan. 9, 1962

3,016,047
DEVICE FOR HYDRAULIC POWERING SYSTEM
Edward P. MacDonough, Dallas, Tex., assignor to Chance Vought Corporation, a corporation of Delaware
Filed Dec. 23, 1959, Ser. No. 861,591
8 Claims. (Cl. 121—38)

This invention relates to hydraulic powering or booster systems for devices, such as aircraft control surface members, subject to reactive forces.

In such power control systems, the pilot input linkage actuates the control valve for a hydraulic motor for producing the desired movement of the powered device until the motion of a follow-up mechanism shifts the control valve back to its neutral position for cutting off the supply of pressured hydraulic fluid to the motor and, thereby, terminating the movement of the powered device. However, the reactive forces on the powered device tend to distort the aircraft framing or bracing in such a way that the action of the follow-up linkage is adversely affected. The strains associated with such reactive forces generally are such as to move the follow-up mechanism in a direction opposite to the motion produced by the hydraulic motor, thus delaying closing of the control valve and letting more pressured fluid into the system than is needed. This excess fluid causes overtravel of the powered device which then causes the valve to move in the opposite direction. This process is self-sustaining, so that such a system can produce divergent oscillations which may be catastrophic.

Counteracting or neutralizing systems which sense distortions in the aircraft framing or bracing itself require the use of additional links and pivotal joints and springs to take up slack inherent in such joints.

Accordingly, it is a major object of the present invention to provide, for a hydraulically powered device such as an aircraft control surface or the like, a follow-up mechanism with means for neutralizing the adverse effects of deflection of a structure carrying reaction loads imparted thereto from the device.

Another object is to provide a follow-up linkage which is substantially simpler and less expensive yet equally or more effective than previous systems for the purpose.

According to the present invention, this result is accomplished, generally, by providing a control horn which, itself, flexes during operation and which is provided with a pair of arms functioning somewhat as a toggle and intersecting in an obtuse angle spaced laterally from the body of the horn. The follow-up linkage is connected to the intersection of these arms so that the shifting of this intersection, during flexing of the horn body, opposes and neutralizes the effect on the follow-up linkage of bodily shifting of the horn due to structural deflections in the aircraft framing or bracing which supports the powered member.

In the accompanying drawing which illustrates an embodiment of the invention, the figure is a schematic representation of a hydraulic powering system for an aircraft control surface member, some parts being shown in section.

The system comprises a pilot's input link 5 connected by a first lever 6 and a link 7 to control valve 8 mounted on or integral with cylinder 9 of a hydraulic motor. Motor piston 10, in turn, is connected by a piston rod or link 11 to terminal pivot 12 on control horn body 13. The horn body is rigidly secured to hollow shaft 14 journaled in an aircraft structural member 15, the shaft being rigidly secured to the aircraft control surface member 16.

Projecting leftwardly and toward each other from the terminal portions of horn body 13, and conveniently integral therewith, are a pair of arms 19 and 20 which intersect at 21 at an obtuse angle. Pivotally connected to the intersection 21 is a follow-up link 22 which is pinned at its opposite end to the lower extremity of a second lever 23 fulcrumed at 24 on aircraft bracing or framing strut 25. Intermediate its ends, second lever 23 is pivotally connected to and supports, by means of pin 26, previously mentioned first lever 6.

Control valve 8 includes a movable element 27, hydraulic inlet and return connections 28, 48, and passages 29 and 30 leading to the hydraulic pressure chambers 31 and 32 at opposite sides of piston 10.

In operation, motion of pilot input link 5 in the direction of arrow 35 shifts control valve element 27 oppositely and in the direction causing the valve to feed pressured hydraulic fluid into motor chamber 32 for extending piston rod 11 and shifting horn body 13 clockwise. This, in turn, shifts control surface member 16 to the position 16A.

This motion of the control horn 13 also acts through follow-up link 22 and lever 23 to shift pivot point 26 of lever 6 in the direction of arrow 36. Theoretically, when the control surface reaches the position corresponding with the assumed position of the operator's control lever and link 5, valve element 27 will close fluid intake 28, stopping motion of the hydraulic motor and member 16. However, motion of powered member 16 sets up reactive strains in the aircraft framing, indicated for example by the dotted line 37, which represents a deflected condition of framing strut 25. This, in turn, causes shifting of pivot member 14 of the horn and control surface 16 in the direction of point 38 and corresponding bodily shifting of the control horn itself. Such shifting of the control horn due to framing deflection causes movement of follow-up link 22 in the direction of arrow 40, in opposition to the motion thereof represented by arrow 39 resulting from action of the hydraulic motor. This opposing force acts upon lever 23 to shift its pivotal support point 26 in the direction of arrow 41 which, in effect, holds valve 8 in an open or pressure fluid supplying condition after the control surface member has reached the desired position. Consequently, the control surface member 16 continues its movement to a false position and may oscillate, as previously mentioned, with serious results.

In order to counteract and neutralize such reactive tendency, body 13 of the control horn tends to flex during powering of control member 16, as represented by the dotted line 42 which represents the centerline of the flexed horn and which of course is greatly exaggerated, as are the other deflection representations, for clarity of disclosure. This flexing of body 13 causes distortion of arms 19 and 20, which, in effect, form toggle links, to shift their intersection point 21 to the position 21a which, in turn, moves link 22 in the direction of arrow 39 in opposition to movement in the direction of arrow 40 produced by deflection in the aircraft framing. The control horn 13 could be designed so that such counteracting motion of the follow-up link will exactly neutralize the motion thereof produced by structural deflection. It is preferable, however, that the deflection of the horn be sufficient to introduce a degree more of motion of the link 22 in the direction of the arrow 39 than is needed to counteract motion in the direction 40 produced by the structural deflection. In this way, a degree of overcompensation is provided which effectively slows and damps motion of the control surface 16 as it nears the position 16A and thus affords a positive stability of the control system and prevents any tendency to oscillation of the control surface about the position 16A. By virtue of the motion of the link 22 in the direction 39 introduced by the horn 13, the resultant action of the follow-up linkage 22 will cause proper functioning of the control valve 8 and hydraulic motor to position powered member 16 in proper relationship to the position of the pilot's input control mechanism connected to the link 5.

The above-mentioned neutralizing action is obtained within the control linkage itself and connections between the hydraulic motor and the powered device and particularly within the control horn portion thereof without use of additional pivoted links and play-eliminating springs.

While only one embodiment of the invention has been described herein and shown in the accompanying drawing, it will be evident that various modifications are possible in the arrangement and construction of the components thereof without departing from the scope of the invention.

I claim:

1. In a hydraulic powering system for actuating a member subject to reactive force, a hydraulic motor; a control valve therefor; a first linkage movable for control of said valve; a second linkage operatively connecting said motor to the actuated member, said second linkage being subject to positional shifting caused by reactive forces on said actuated member and including structure subject to distortion by said reactive forces in a direction in opposition to said shifting of said second linkage; and a follow-up linkage connecting said structure of said second linkage to said first linkage, said follow-up linkage being constructed and arranged to close said control valve when said input element and powered member are in predetermined relationship, the distortion of said structure serving to neutralize the effects on said follow-up linkage and said control valve of positional shifting of said second linkage.

2. A hydraulic powering system as described in claim 1 in which said structure comprises a plurality of elements which are distortable due to reactive forces on said powered member, said second linkage also including a common part connected to each of said latter elements whereby the distortional effects on said latter elements neutralize the effects on said control valve of said positional shifting of said second linkage.

3. In a hydraulic powering system, for actuating a member subject to reactive forces, a hydraulic motor; a control valve therefor; a first linkage connected to said valve including an operator's control element; a second linkage connecting said motor and the actuated member, said second linkage being subject to positional shifting caused by reactive forces on said actuated member and including a part subject to distortion by said reactive forces in a direction in opposition to said positional shifting of said second linkage; and a follow-up linkage connecting said part and said first linkage for actuating the latter to close said valve when the actuated member reaches a position corresponding with that of said operator's element, the distortions caused in said part by said reactive forces functioning to neutralize the effects on said valve of said positional shifting of said second linkage caused by said reactive forces.

4. A hydraulic powering system as described in claim 3 in which the powered member is mounted for pivotal movements and said second linkage comprises a lever rigidly secured to said powered member for actuating the same, said lever being bodily shiftable by reactive forces on said member to move said follow-up linkage in one direction, said lever also being bendable for moving said follow-up linkage in the opposite direction to neutralize the effect of the reactive forces on said powered member exerted through said follow-up linkage on said control valve.

5. A hydraulic powering system for actuating a pivotable member subject to reactive forces comprising a hydraulic motor; a control valve therefor; a first linkage connected to said control valve including an operator's control element; a second linkage connecting said motor to the powered member and including a lever rigid with and projecting from said member; a pair of arms projecting toward each other from longitudinally spaced portions of said lever and intersecting intermediately of said portions; and a follow-up linkage connecting the intersection of said arms with said control valve for closing said valve when said powered member is in predetermined relationship with said operator's control element, said lever being subject to bodily shifting which is caused by reactive forces on said actuated member and which urges said follow-up linkage in one direction and also being bendable by said forces in the plane of said arms for urging said intersection of said arms and said follow-up linkage in the opposite direction so as to neutralize the effect of said reactive forces on said control valve.

6. In a hydraulic powering system for actuating a member, a hydraulic motor; a control valve therefor; a valve-operating linkage including an operator's control link, a lever pivoted at one end thereto, and a link connecting the other end of said lever to said valve; a second linkage connecting said motor to the actuated member and including a part subject to opposing movements caused by reactive forces on said powered member; and a follow-up linkage including a third link pivoted at one end to said part, a second lever pivoted at one end to the other end of said third link, the other end of said second lever being fixed, said second lever, pivotally supporting said first lever at a point intermediate the ends of the second lever for transmitting motions of said actuated member through said first lever to said control valve, the opposing movements of said part caused by said reactive forces acting to neutralize the effect of said reactive forces on said control valve.

7. In a hydraulic powering system for an aircraft control member pivotally mounted on the aircraft framing and subject to reactive torque, a hydraulic motor; a control valve therefor having an actuating link; a pilot's control element; a first lever operatively connecting said link and said element; a second lever having a pivotally fixed fulcrum and pivotally supporting said first lever; a control horn rigid with said control member and operatively connected to said hydraulic motor, said horn being laterally flexible under the influence of said reactive forces and having a pair of arms projecting toward each other from its terminal portions and intersecting at an obtuse angle; and a follow-up linkage connecting the intersection of said arms with said second lever for transmitting motions of said aircraft control member through said levers to said control valve, the intersection of said arms being subject to shifting, caused by flexing of said horn, in a direction opposite to shifting of said horn caused by reactive forces on the aircraft framing for neutralizing the effect of said reactive forces on said follow-up linkage and control valve.

8. In combination with an aircraft control surface member, a control horn comprising: an elongated, flexible body having one end rigidly mounted on the aircraft control surface member and another end which extends outwardly from and is free to flex relative to said member and adapted for connection to powering means; a pair of arms connected to spaced portions of said body and intersecting at an obtuse angle at a point free of attachment to said control surface member and spaced laterally from said body; and means at the intersection of said arms for attachment of a follow-up linkage.

References Cited in the file of this patent

UNITED STATES PATENTS

| 2,324,224 | Meredith | July 13, 1943 |
| 2,573,943 | Ziskal | Nov. 6, 1951 |
| 2,738,772 | Richter | Mar. 20, 1956 |
| 2,757,641 | Meddock | Aug. 7, 1956 |
| 2,899,152 | Weiland | Aug. 11, 1959 |

FOREIGN PATENTS

| 42,005 | Denmark | Mar. 28, 1930 |